(12) United States Patent
Singh

(10) Patent No.: US 10,963,177 B2
(45) Date of Patent: Mar. 30, 2021

(54) DEDUPLICATION USING FINGERPRINT TRIES

(71) Applicant: EMC IP Holding Company LLC, Hopkinton, MA (US)

(72) Inventor: Sweetesh Singh, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 255 days.

(21) Appl. No.: 15/966,138

(22) Filed: Apr. 30, 2018

(65) Prior Publication Data

US 2019/0332300 A1    Oct. 31, 2019

(51) Int. Cl.
*G06F 3/06* (2006.01)
*G06F 16/22* (2019.01)

(52) U.S. Cl.
CPC ............ *G06F 3/0641* (2013.01); *G06F 3/067* (2013.01); *G06F 16/2246* (2019.01); *G06F 16/2255* (2019.01)

(58) Field of Classification Search
None
See application file for complete search history.

(56) References Cited

U.S. PATENT DOCUMENTS

| | | | | |
|---|---|---|---|---|
| 9,292,530 B2* | 3/2016 | Nag Yasa | ............ | G06F 16/1748 |
| 9,542,480 B2* | 1/2017 | Welch | ..................... | G06F 16/35 |
| 9,659,047 B2* | 5/2017 | Sharma | ............... | G06F 16/1748 |
| 9,672,556 B2* | 6/2017 | Welch | ................... | G06F 16/353 |
| 9,798,728 B2* | 10/2017 | Zheng | ................. | G06F 16/1752 |
| 10,354,009 B2* | 7/2019 | Liang | ...................... | G06F 40/30 |
| 2013/0018932 A1* | 1/2013 | Bhaskar | .................. | H03M 7/30 708/203 |
| 2014/0223030 A1* | 8/2014 | Bhaskar | .................. | H04L 69/04 709/247 |
| 2017/0017650 A1* | 1/2017 | Ciabarra, Jr. | ........... | G06F 16/14 |
| 2017/0339064 A1* | 11/2017 | Dillon | ................. | H04L 65/4069 |

OTHER PUBLICATIONS

Wikipedia, "Data deduplication," Apr. 6, 2018, https://en.wikipedia.org/wiki/Data_deduplication.

(Continued)

*Primary Examiner* — Kim T Nguyen
(74) *Attorney, Agent, or Firm* — Muirhead and Saturnelli, LLC

(57) ABSTRACT

A fingerprint trie is used to store fingerprints for data portions stored on a storage system for use in implementing data deduplication on a storage system. The fingerprint trie may be used to compare fingerprint values to determine duplicate data portions, for example, in response to I/O operations. Leaf nodes of the fingerprint trie may be keyed by fingerprints, and a value of each leaf node may be a reference to the physical storage location of the data portion from which the fingerprint was generated. When an I/O operation is received, a fingerprint may be generated for each of one or more data portions included in the I/O operation. A fingerprint trie may be searched, for example by traversing multiple nodes of the trie according to pointers provided by the nodes, to determine whether there is any matching fingerprint specified in the fingerprint trie.

14 Claims, 12 Drawing Sheets

(56) References Cited

OTHER PUBLICATIONS

Wikipedia, "Radix tree," Jun. 24, 2018, https://en.wikipedia.org/wiki/Radix_tree.

Wikipedia, "Trie," Jun. 29, 2018, https://en.wikipedia.org/wiki/Trie.

Vaidehi, Joshi, "Compressing Radix Trees Without (Too Many) Tears," Aug. 7, 2017, https://medium.com/basecs/compressing-radix-trees-without-too-many-tears-a2e658adb9a0.

P.F. Windley, et al., "Binary search tree," Retrieved from https://en.wikipedia.org/w/index.php?title=Binary_search_tree&oldid=801134990, Sep. 17, 2017.

Venkata L. R. Ippatapu, et al., U.S. Appl. No. 15/728,758, filed Oct. 10, 2017, "Host Data Replication Using Deduplication and Binary Search Trees".

Venkata L. R. Ippatapu, et al., U.S. Appl. No. 15/879,813, filed Jan. 25, 2018, "Data Replication Using Deduplication and Synchronized Hash Tables".

\* cited by examiner

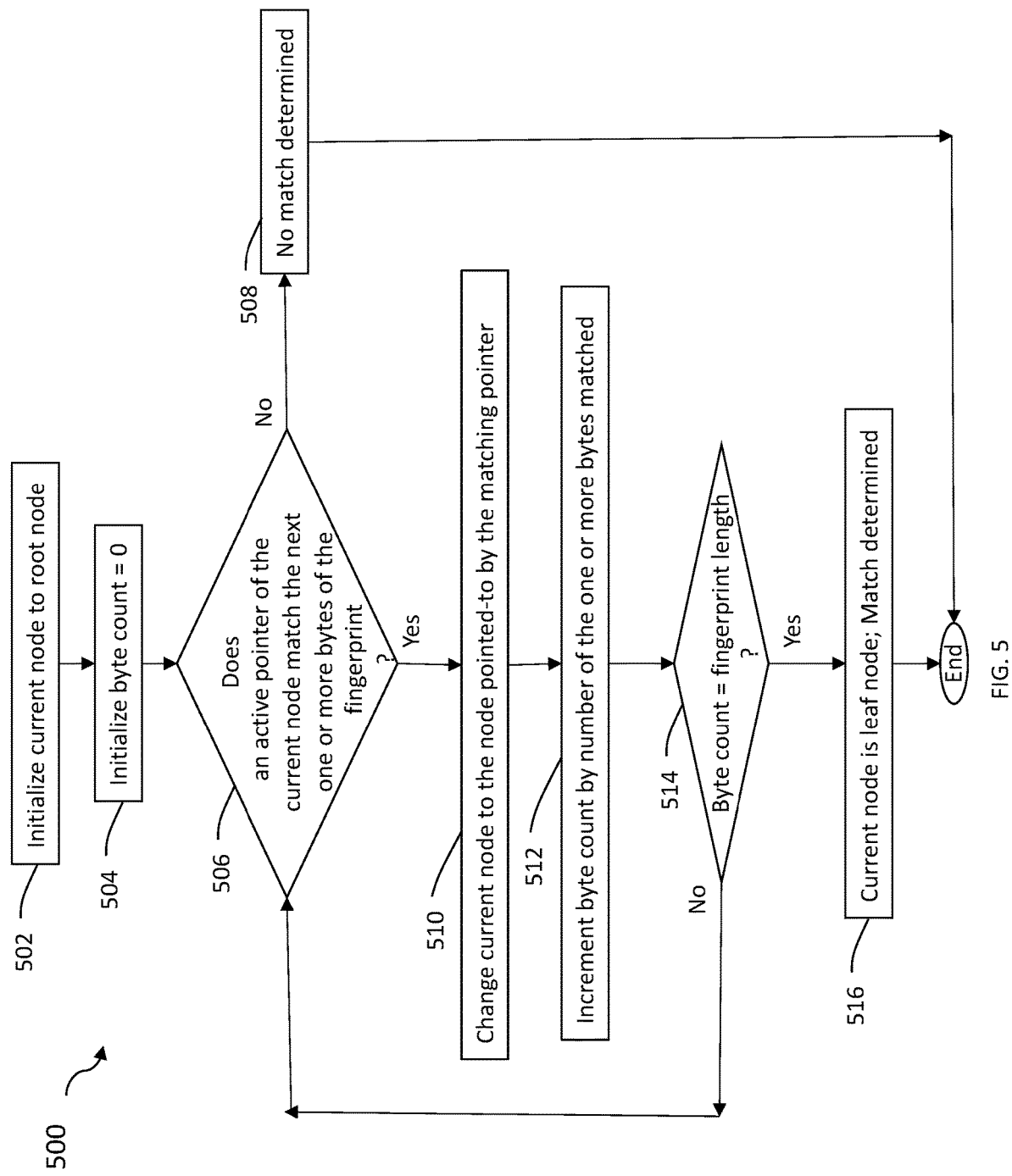

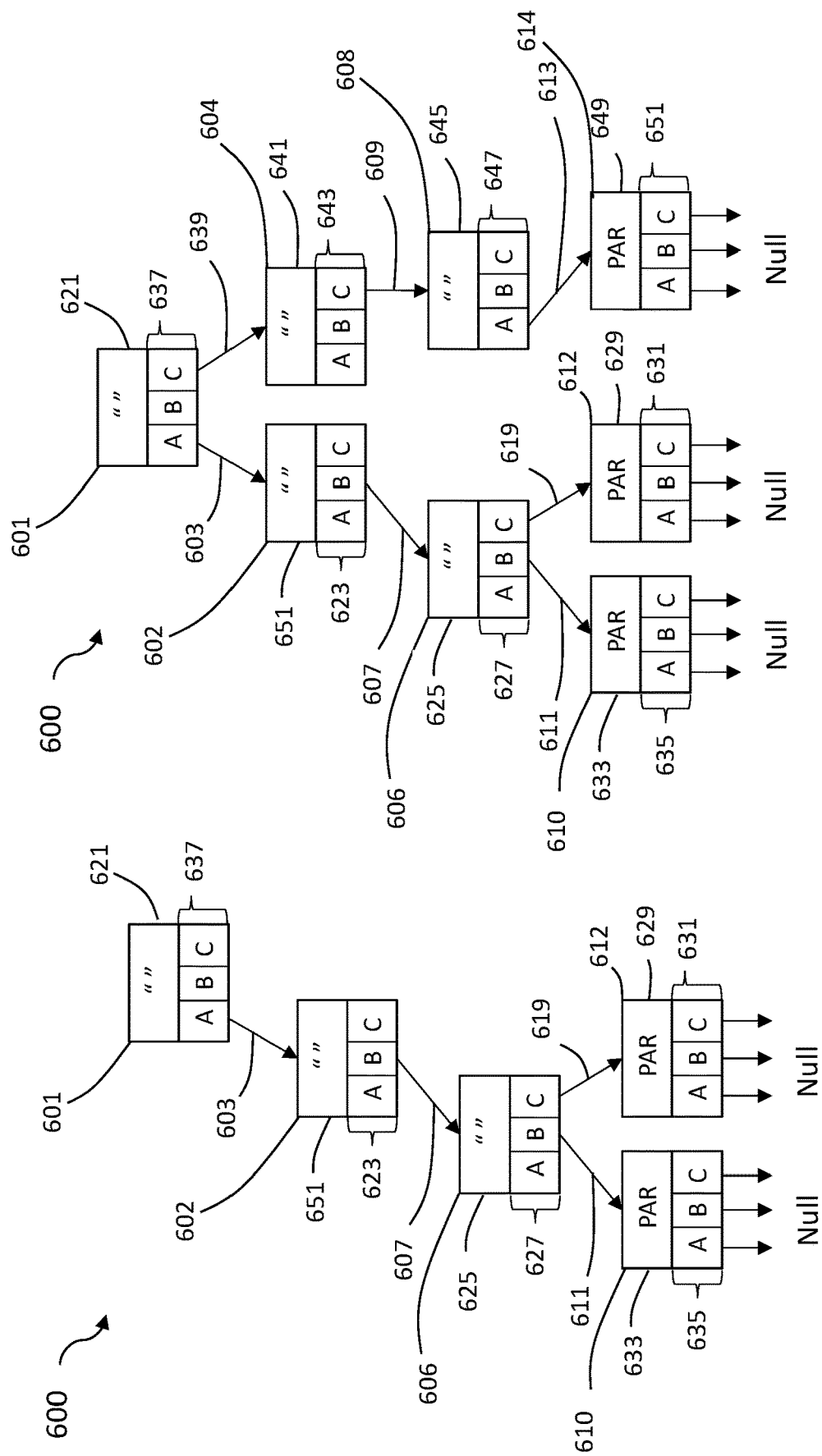

DEDUPLICATION USING FINGERPRINT TRIES

BACKGROUND

Technical Field

This application generally relates to data storage and more particularly to techniques used in connection with data deduplication.

Description of Related Art

Data duplication or "dedupe" reduces the amount of data stored in a data storage system by determining identical (or presumably identical) portions of data stored, or intended to be stored, in the data storage system, and only storing a single instance of the data portion "to disk"—i.e., persisting in non-volatile memory, e.g., tape, disk or solid state, of the data storage system. In post-process deduplication, these identical data portions are determined after the data is stored to disk. In in-line deduplication, these identical portions are determined before the data including the identical portion is stored to disk.

To determine identical data portions, digital fingerprints (hereinafter "fingerprints") of data portions are generated and compared to previously generated fingerprints. A fingerprint serves as an identifier of data having a fixed size that is less than the size of the data itself, desirably much less in size. A fingerprint may be generated by applying a hash function to data, for example, Message Digest 5 (MD5), Secure Hash Algorithm 1 (SHA-1), SHA-2 or SHA-256, etc., to produce a hash value or digest of the data. Fingerprints may be stored in an entry of a hash table, for example, in volatile memory of the data storage system, along with an indication of the location at which the actual data is stored within the data storage system, e.g., on disk. Each new hash value generated for an I/O (e.g., write) operation may be compared to hash table entries to determine whether there is a match, in which case, rather than storing the data from which the hash value was generated to disk, a reference (e.g., pointer) to the hash entry in the hash table or the physical storage location of the data portion represented by the hash entry may be maintained, for example, in a physical address reference table.

In some systems, a hash table in which linked-lists are employed may be used. In such systems, the hash table may be configured to have a predefined number of entries less than the number of potential unique fingerprint values for a given storage system. In such systems, a mathematical function (e.g., a Murmur function) may be used to translate every hash value into a value (e.g., an integer) corresponding to an entry of the table, where the mathematical function may translate/map multiple hash values to a same hash table entry value. For such systems, for entries to which multiple hashes map/translate, a linked list of fingerprints may be maintained, where each linked item in the linked list specifies a fingerprint, a physical storage location (or an indirect reference thereto) of the data portion corresponding to the fingerprint and a link to a next linked item in the linked list, if any. Further, in some systems, a contiguous amount of memory may be reserved for the hash table; i.e., enough to accommodate the number of entries of the hash table, but not necessarily the linked items for each entry. Given the capacity of some of today's storage systems; i.e., on the order of petabytes (PB; $10^{15}$ bytes), in some cases the size of a hash table, and thus the contiguous memory space to accommodate the hash table, can be substantial. For example, for a terabyte (TB; $10^{12}$ bytes) of storage capacity, it may be desirable (depending on the granularity of the data portions being deduplicated) to have a hash table on the order of 4 gigabytes (GB), which, depending in part on the entropy of the data being deduplicated, could result in the linked list of a single entry being several megabytes or even gigabytes in size. Even though a large amount of memory may be reserved for a hash table, much of this memory space may go unused if fingerprints are not generated for many entries, for example, if the entropy of the data which it is being used is low and/or a relatively low amount of the storage capacity of the storage system is used.

In such systems, to perform deduplication on a current data portion, a fingerprint is generated for the data portion, and then a mathematical function is applied to the fingerprint to map it to a hash table entry. If there are any other fingerprints already stored for the entry (e.g., one, or a linked list), then the generated fingerprint is compared to each fingerprint at the entry. If there is a match, a reference to the physical storage location of the data portion corresponding to the matched entry is recorded in the physical table address entry for the current data portion. If no fingerprint of the hash table entry matches, a new link item is added to the linked list for the generated fingerprint of the current data portion. If there are no other fingerprints already stored for the entry, then the fingerprint generated for the current data portion becomes the first item stored in the entry. Thus, performing deduplication for a data portion can be computationally expensive, involving at least: generating a fingerprint, applying a mathematical function to map the fingerprint to a hash table entry, potentially traversing multiple linked items for a single hash table entry, and comparing fingerprint values to fingerprint values of each item (if any) of a linked list of a hash table entry. Moreover, the computation resources consumed depends on the number of fingerprints stored in the hash table; e.g., the number of linked items in each linked list of a hash table entry. Further, as described above, significant amounts of memory may need to be reserved and/or used to implement a hash table with liked lists, and much of this reserved memory may not be used, which is an inefficient use of memory resources.

It may be desirable when using fingerprints to implement data deduplication on a data storage system to reduce an amount of memory consumed and potentially unused, to reduce the amount of computational resources consumed, and to make computation resources consumed less dependent on the number of fingerprints currently stored in memory.

SUMMARY OF THE INVENTION

In some embodiments of the invention, a method of performing deduplication on a first data portion of an I/O operation for a storage system is performed. The method includes generating a first fingerprint of the first data portion, and searching a fingerprint trie generated from a plurality of fingerprints generated from a plurality of data portions to determine whether the first data portion is a duplicate of one of the plurality of data portions. The fingerprint trie may be a compressed fingerprint trie. The fingerprint trie may have a root node, and the first fingerprint may have a predefined number of bytes, where searching the fingerprint trie includes determining whether the root node references a first node of the fingerprint trie representing a string of one or more characters matching one or more characters represented by one or more bytes of the predefined number of bytes of the first fingerprint. The method may further include, if it is determined that the root node references the first node, determining whether the first node references a second node of the fingerprint trie representing a string of one or more characters matching one or more characters represented by one or more bytes of the predefined number of bytes of the first fingerprint succeeding the first string. It may be determined that the first data portion is not a duplicate of the one or the plurality of data portions if it is determined that there is not a first node of the fingerprint trie representing a string of one or more characters matching one or more characters represented by one or more bytes of the predefined number of bytes of the first fingerprint. The method may further include, if it determined by searching the fingerprint trie that the first data portion is not a duplicate of the one or the plurality of data portions, modifying the fingerprint trie to include a representation of the first fingerprint. The method may further include, if it determined by searching the fingerprint trie that the first data is a duplicate of the one or the plurality of data portions, copying a physical storage address reference from a node of the fingerprint trie corresponding to the determined duplicate, and storing the physical storage address reference in an entry of a physical address reference table corresponding to the first data portion.

In some embodiments, a system for performing deduplication on a first data portion of an I/O operation, the system including one or more processors and a memory including code stored thereon that, when executed, performs a method including generating a first fingerprint of the first data portion and searching a fingerprint trie generated from a plurality of fingerprints generated from a plurality of data portions to determine whether the first data portion is a duplicate of one of the plurality of data portions. The fingerprint trie may be a compressed fingerprint trie. The fingerprint trie may have a root node, and the first fingerprint may have a predefined number of bytes, where searching the fingerprint trie includes determining whether the root node references a first node of the fingerprint trie representing a string of one or more characters matching one or more characters represented by one or more bytes of the predefined number of bytes of the first fingerprint. The method may further include, if it is determined that the root node references the first node, determining whether the first node references a second node of the fingerprint trie representing a string of one or more characters matching one or more characters represented by one or more bytes of the predefined number of bytes of the first fingerprint succeeding the first string. It may be determined that the first data portion is not a duplicate of the one or the plurality of data portions if it is determined that there is not a first node of the fingerprint trie representing a string of one or more characters matching one or more characters represented by one or more bytes of the predefined number of bytes of the first fingerprint. The method may further include, if it determined by searching the fingerprint trie that the first data portion is not a duplicate of the one or the plurality of data portions, modifying the fingerprint trie to include a representation of the first fingerprint. The method may further include, if it determined by searching the fingerprint trie that the first data is a duplicate of the one or the plurality of data portions, copying a physical storage address reference from a node of the fingerprint trie corresponding to the determined duplicate, and storing the physical storage address reference in an entry of a physical address reference table corresponding to the first data portion.

In some embodiments, a non-transitory computer-readable medium having software stored thereon for performing deduplication on a first data portion of an I/O operation may be provided. The software includes executable code that generates a first fingerprint of the first data portion, and executable code that searches a fingerprint trie generated from a plurality of fingerprints generated from a plurality of data portions to determine whether the first data portion is a duplicate of one of the plurality of data portions. The fingerprint trie may be a compressed fingerprint trie. The fingerprint trie may have a root node, and the first fingerprint may a predefined number of bytes, and where the executable code that searches the fingerprint trie included executable code that determines whether the root node references a first node of the fingerprint trie representing a string of one or more characters matching one or more characters represented by one or more bytes of the predefined number of bytes of the first fingerprint. The software may further include executable code that, if it is determined that the root node references the first node, determines whether the first node reference a second node of the fingerprint trie representing a string of one or more characters matching one or more characters represented by one or more bytes of the predefined number of bytes of the first fingerprint succeeding the first string. The software may further include executable code that, if it determined by searching the fingerprint trie that the first data portion is not a duplicate of the one or the plurality of data portions, modifies the fingerprint trie to include a representation of the first fingerprint. The software may further include executable code that, if it determined by searching the fingerprint trie that the first data is a duplicate of the one or the plurality of data portions, copies a physical storage address reference from a node of the fingerprint trie corresponding to the determined duplicate and stores the physical storage address reference in an entry of a physical address reference table corresponding to the first data portion.

BRIEF DESCRIPTION OF THE DRAWINGS

Features and advantages of the present invention will become more apparent from the following detailed description of illustrative embodiments thereof taken in conjunction with the accompanying drawings in which:

FIG. 5 is a flowchart illustrating an example of a method of searching a fingerprint trie to determine whether there is a fingerprint match according to embodiments of the invention;

FIGS. 7A-7D illustrate a more detailed example of a standard fingerprint trie, according to embodiments of the invention;

DETAILED DESCRIPTION OF EMBODIMENTS

Figure 1:
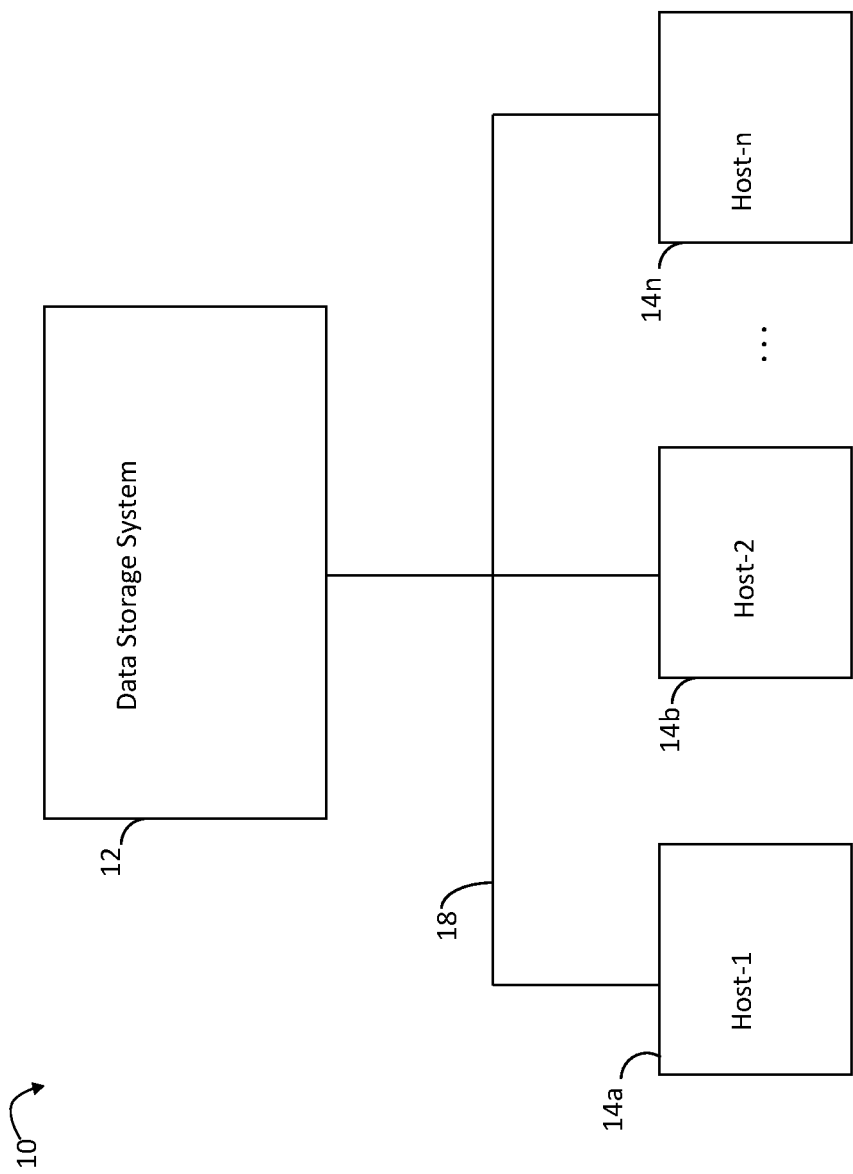
FIG. 1 is a block diagram illustrating an example of a system according to embodiments of the invention.

Described herein is a system and techniques in which a trie, for example, a standard trie or a compressed trie like a radix trie, suffix trie, HAT-trie or the like, are used to store fingerprints for data portions stored on a storage system for use in implementing data deduplication on a storage system. Such a trie of fingerprints (i.e., a "fingerprint trie") may be used to compare fingerprint values to determine duplicate data portions, for example, in response to I/O (e.g., write) operations. As will become clear from the more detailed description herein, using a fingerprint trie, in particular a compressed trie (e.g., a radix trie of fingerprints), instead of a hash table of fingerprints may reduce an amount of memory required to store fingerprints (e.g., in local memory of a director), reduce an amount of computational resources consumed in determining matching fingerprints in performing data deduplication, resulting in faster times in determining fingerprint matches, and make the amount of computation resources consumed dependent more on a size of the fingerprints searched, as opposed to the number of fingerprints stored in memory.

Tries, including compressed tries, are a known type of data structure. In some embodiments of the invention, a non-compressed trie (i.e., a standard trie) may be used to store and search fingerprints, referred to herein as a standard fingerprint trie, and in some embodiments a compressed trie may be used, referred to herein as a compressed fingerprint trie. Although the example of a radix trie is used to illustrate compressed-trie embodiments of the invention, the invention is not so limited, as other types of compressed tries already known or later developed may be used such as, for example, a suffix trie, HAT-trie, adapted radix trie, other type of compressed trie, or any suitable combination of the foregoing, and are intended to fall within the scope of the invention. Fingerprint tries are described in more detail elsewhere herein.

In some embodiments of the invention, leaf nodes of the fingerprint trie are keyed by fingerprints, and a value of each leaf node is a reference to the physical storage location of the data portion from which the fingerprint was generated. This reference could be a reference to another data structure, for example, an entry in a physical storage address table, or the physical storage address itself (e.g., the logical block address (LBA)) on disk. The value of other nodes in the fingerprint trie, i.e., the root node and internal nodes, may be set to null or an empty string.

When an I/O operation, for example, a write operation originating from a host, is received, a fingerprint may be generated for each of one or more data portions included in the I/O operation. A fingerprint trie may be searched, for example by traversing a multiple nodes of the trie according to pointers provided by the nodes, to determine whether there is any matching fingerprint specified in the fingerprint trie. If a matching fingerprint is found in the fingerprint trie, an entry in a physical address reference table for the data portion from which the fingerprint being searched was generated may be updated to reference a storage location specified at a node in the fingerprint trie for the matching fingerprint, and the fingerprint trie may remain unchanged. If it is determined that there is no matching fingerprint in the fingerprint trie for a current generated fingerprint, the fingerprint trie may be modified, for example, by creating at least one new leaf node and modifying one or more existing nodes, as described in more detail elsewhere herein.

In some embodiments, a maximum number of nodes in the fingerprint trie that need to be accessed to determine a match is equal to a number of bytes (e.g., 20) in the fingerprint being searched, which may be a predefined, plus one for the root node, which needs to be accessed for all searches.

In some embodiments, logic may be provided (e.g., as part of a rule engine) that determines what data structure (e.g., a hash table or a trie) to employ for storing and searching search fingerprints to implement deduplication on a storage system. Such logic may factor the amount or anticipated amount of data to be stored, the entropy or anticipated entropy of the data, the number and/or frequency of actual or anticipated data reads, writes, searches, updates, additions and deletions, the granularity of deduplication to be performed, the compute, network and storage capacities of the system, the desired and/or required (e.g., based on service level objectives and the like) performance, etc. Further, the system may be configured to select fingerprint data structures based on historical data; i.e., what type of data structure was selected in the past based on a set of factors like those listed above, for example, by employing machine-learning techniques. That is, a system may be configured with a machine-learning model to train itself on historical fingerprint data, including data structure choices, and make predictions for an optimal data structure choice, for example, based on one or more desired performance metrics (e.g. speed, reliability, etc.).

Referring now to FIG. 1, shown is an example of an embodiment of a system 10 according to some embodiments of the invention. The system 10 includes a data storage system 12 connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be appreciated that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Communication media that may be used to provide the different types of connections between the host computer systems and the data storage system of the system 10 may use a variety of different communication protocols such as SCSI, ESCON, Fibre Channel, iSCSI, or GIGE (Gigabit Ethernet), and the like. Some or all of the connections by which the hosts and data storage system 12 may be connected to the communication medium 18 may pass through other communication devices, such as switching equipment, a phone line, a repeater, a multiplexer or even a satellite.

Each of the host computer systems may perform different types of data operations in accordance with different tasks and applications executing on the hosts. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

Figure 2A:
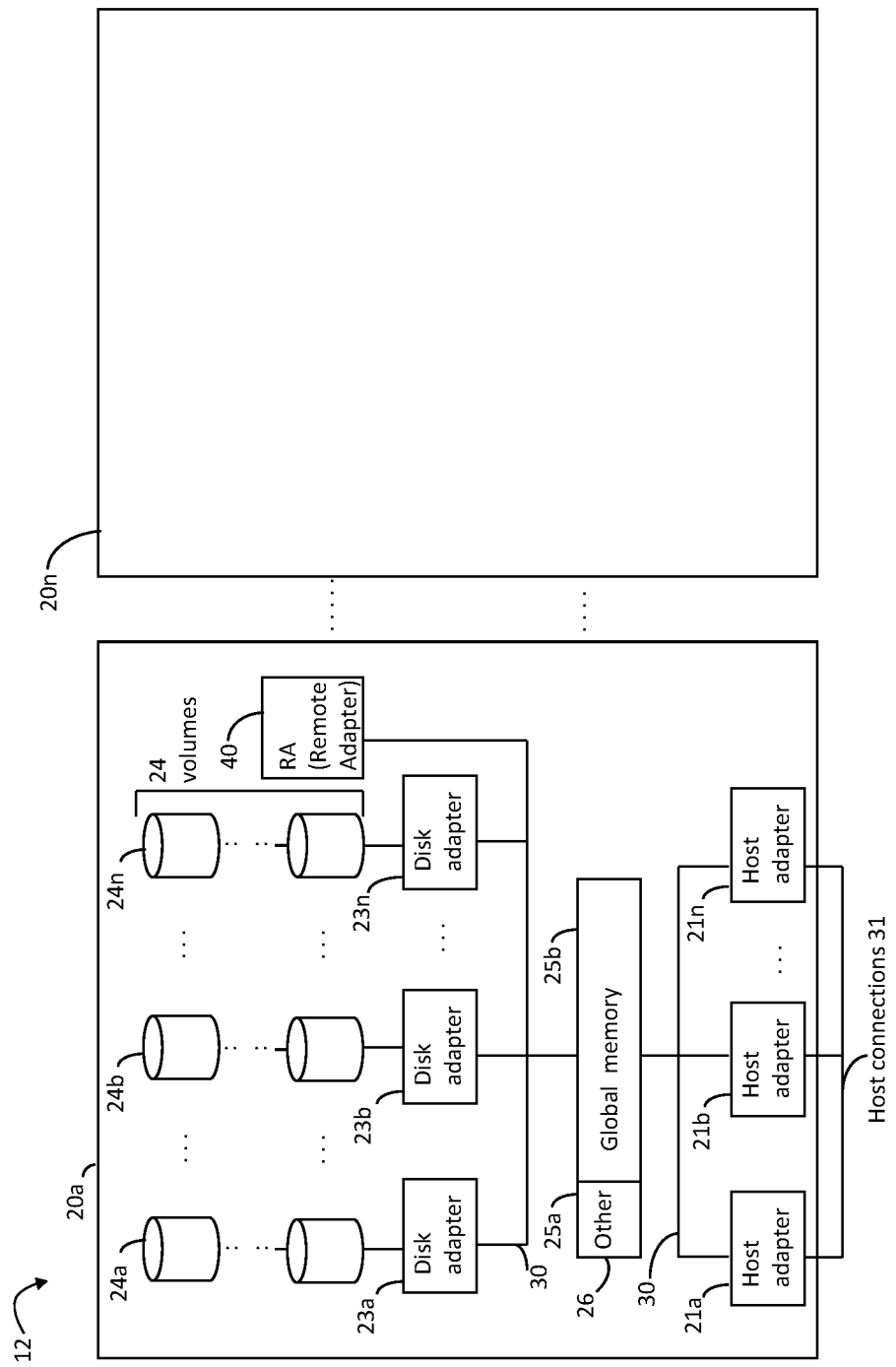
FIG. 2A is a block diagram illustrating an example of a data storage system according to embodiments of the invention.

Referring now to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example, as described in more detail in following paragraphs, reference is made to the more detailed view of element 20a. It should be noted that a similar more detailed description also may apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems.

Each of the data storage systems, such as 20a, may include a plurality of data storage devices (e.g., physical non-volatile storage devices), such as disk devices or volumes, for example, in an arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a. System 20a also may include a fabric that enables any of disk adapters 23a-23n to access any of disks or volumes 24-24N, in which one or more technologies and/or protocols (e.g., NVMe or NVMe-oF) may be employed to communicate and transfer data between the DAs and the disks or volumes. The system 20a may also include one or more host adapters ("HAs") or directors 21a-21n. Each of these HAs may be used to manage communications and data operations between one or more host systems and the global memory. In an embodiment, the HA may be a Fibre Channel Adapter or other type of adapter which facilitates host communication.

Also shown in the storage system 20a is an RA or remote adapter 40. The RA may be hardware including a processor used to facilitate communication between data storage systems, such as between two of the same or different types of data storage systems.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

It should be generally noted that the elements 24a-24n denoting data storage devices may be any suitable storage device such as a rotating disk drive, flash-based storage, and the like. The particular data storage system as described in this embodiment, or a particular device thereof, such as a rotating disk or solid-state storage device (SSD; e.g., a flash-based storage device), should not be construed as a limitation. Other types of commercially available data storage systems, as well as processors and hardware controlling access to these particular devices, may also be included in an embodiment.

In at least one embodiment, write data received at the data storage system from a host or other client may be initially written to cache memory (e.g., such as may be included in the component designated as 25b) and marked as write pending. Once written to cache, the host may be notified that the write operation has completed. At a later point time, the write data may be destaged from cache to the physical storage device, such as by a DA.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices, logical volumes or logical units (LUNs). The LUNs may or may not correspond to the actual disk drives. For example, one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LUN(s) residing thereon.

Figure 2B:
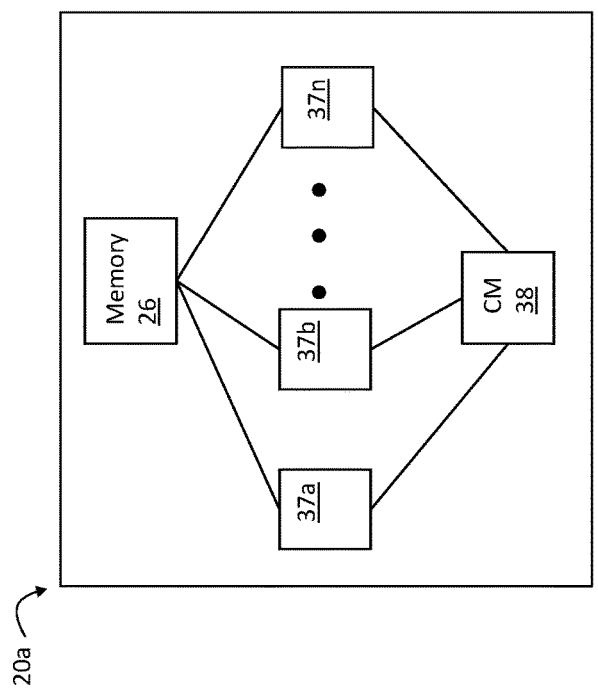
FIG. 2B is a block diagram illustrating an example of logical internal communications between directors and memory of the data storage system of FIG. 2A according to embodiments of the invention.

Referring to FIG. 2B, shown is a representation of the logical internal communications between the directors and memory included in a data storage system according to some embodiments of the invention. Included in FIG. 2B is a plurality of directors 37a-37n coupled to the memory 26. Each of the directors 37a-37n represents one of the HAs, RAs, or DAs that may be included in a data storage system. In an embodiment disclosed herein, there may be up to sixteen directors coupled to the memory 26. Other embodiments may use a higher or lower maximum number of directors that may vary. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

In an embodiment of a data storage system in accordance with techniques herein, components such as HAs, DAs, and the like may be implemented using one or more "cores" or processors each having their own memory used for communication between the different front end and back end components rather than utilize a global memory accessible to all storage processors.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

Storage system 12 or one or more components thereof described in relation to FIGS. 1-2B may be implemented using one or more Symmetrix®, VMAX® or VMAX3® systems (hereinafter referred to generally as VMAX storage systems) made available from Dell EMC.

Figure 3:
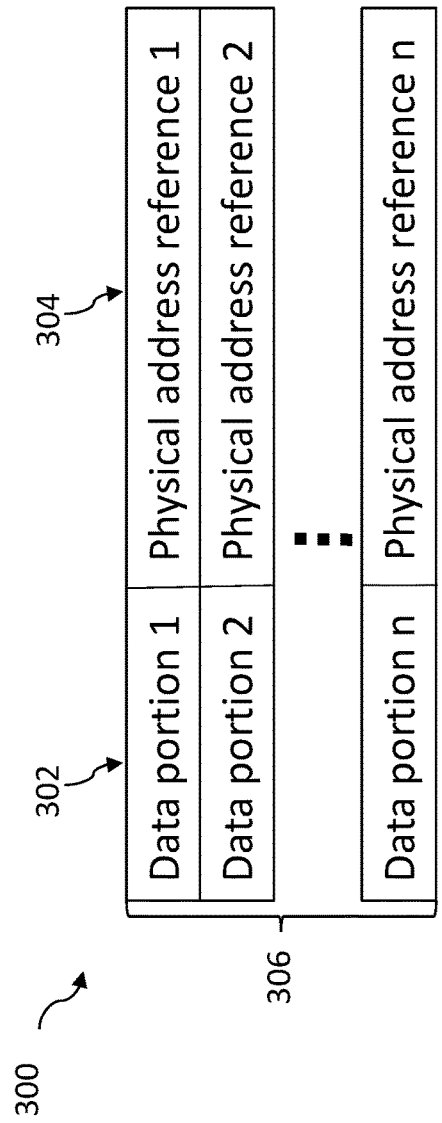
FIG. 3 is a block diagram illustrating an example of a physical address reference table according to embodiments of the invention.

FIG. 3 is a block diagram illustrating an example of a physical address reference table 300 according to embodiments of the invention. Other embodiments of a physical address reference table, for example, variations of physical address reference table 300, are possible and are intended to fall within the scope of the invention. The physical address table 300 may be included in one or more of the components of the storage system 12, for example, as part of a director (e.g., a disk adapter), e.g., in local memory of a director, or in global memory. The physical address table 300 may include a data portion column 302, physical address reference column 304, perhaps other columns (not shown) and a plurality of entries 306. Each of the entries 306 may specify an identifier of a data portion (e.g., defined by one or more logical mapping layers of the storage system) in the data portion column 302 and a physical address reference to the location on a physical storage device (i.e., disk or SSD device) in the physical address reference column 304. For example, the physical address reference may be a logical block address (LBA). As described in more detail elsewhere herein, when it is determined that a data portion of an I/O operation is a duplicate of another data portion already stored on the storage system, the physical address reference specified in the physical address reference field of an entry in the physical address reference table 300 for the already-stored data portion may be copied to the physical address reference field in an entry in the physical address reference table 300 for the data portion of the I/O operation.

Figure 4:
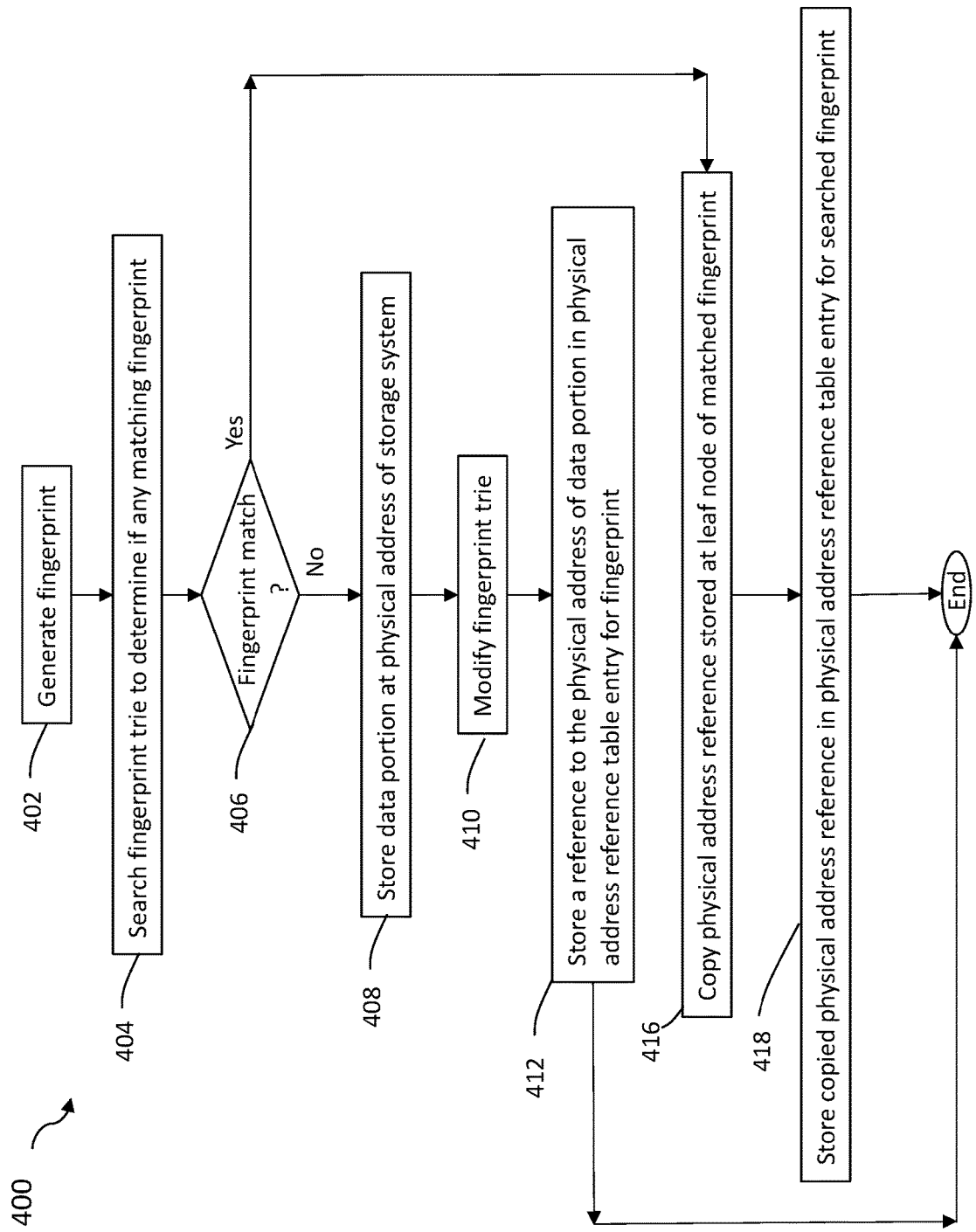
FIG. 4 is a flowchart illustrating an example of a method of using a fingerprint trie to perform aspects of data deduplication according to embodiments of the invention.

FIG. 4 is a flowchart illustrating an example of a method 400 of using a fingerprint trie to perform aspects of data deduplication according to embodiments of the invention. Other embodiments of a method of using a fingerprint trie to perform aspects of data deduplication, for example, variations of method 400, are possible and are intended to fall within the scope of the invention. Method 400 and/or portions thereof may be implemented using data storage system 12 and/or one or more components thereof. Method 400 may be performed in response to receiving an I/O request (e.g., a write request) from a host, the I/O request specifying an I/O operation (e.g., a write) and data on which to perform the I/O operation. The data may be partitioned into a plurality of data portions of predetermined size (e.g., 128 KB) depending on the granularity of deduplication to be performed. The predetermined size may correspond to a physical or logical construct within the system, for example, a size defined for a track on a disk. Other sizes may be used, which may correlate or at least take into consideration logical and physical constructs of the storage system, including, but not limited to, an extent, a super-extent, sub-extent, disk sector, block, object or file. Data deduplication may be performed on each data portion according to the method 400.

In a step 402, a fingerprint may be generated for the data portion. Any of a variety of known or future developed techniques may be used to generate a fingerprint, for example, application of any of a variety of hash functions, e.g., in accordance with one of more standards such as, for example, MD5, SHA-1, SHA-2, SHA-256, other encryption standards or a variation of any other foregoing. Other hash functions may be used. The size of the resulting fingerprint can be configured to be any of a variety of sizes based on any of a variety of factors such as, for example, the size of the data portion to be fingerprinted, the desired number of possible fingerprint values, the likelihood of generating the same fingerprint for different data portions (i.e., the likelihood of generating a false fingerprint match), compute and storage resource available and that would be consumed, etc. In some embodiments, for example, when a data portion size is 128 KB, the fingerprint size may be configured to be 20 bytes. Other fingerprint sizes are possible and are intended to fall within the scope of the invention.

In a step 404, a fingerprint trie may be searched to determine if there is any matching fingerprint, as described in more detail elsewhere herein. If it is determined in the step 404 that there is a matching fingerprint, then a step 406 may control the method 400 to proceed to a step 416. In some embodiments, determining a match in the step 404 includes determining a leaf node in the fingerprint trie corresponding to the fingerprint generated in the step 402, as described in more detail elsewhere herein. In the step 416, a physical address reference stored at the leaf node of the matched fingerprint in the fingerprint trie may be copied, and in a step 418, the copied physical address may be stored in an entry of a physical address reference table (e.g., the physical address reference table 300) corresponding to the data portion for which the fingerprint was generated in the step 402.

If it is determined in the step 404 that there is not a matching fingerprint in the fingerprint trie to the generated fingerprint, then the step 406 may control the method 400 to proceed to a step 408 in which the data portion from which the fingerprint was generated is stored at a physical storage address on a physical storage device of the storage system. In a step 410, the fingerprint trie may be modified to add nodes and links for the generated fingerprint, as described in more detail elsewhere herein. In a step 412, a reference to the physical storage address of the generated fingerprint may be stored in an entry of a physical address reference table (e.g., the physical address reference table 300) corresponding to the data portion for which the fingerprint was generated. It should be appreciated that one or more steps of the method 400, or parts thereof may be performed concurrently or in different orders than illustrated in FIG. 4. For example, the steps 410 and 412 may be performed concurrently to, or before, the performance of the step 408. For example, a physical storage location for the generated fingerprint may be determined, and the fingerprint trie modified, prior to the data portion being stored on the physical storage device.

FIG. 5 is a flowchart illustrating an example of a method 500 of searching a fingerprint trie to determine whether there is a fingerprint match according to embodiments of the invention, which may be used to implement the step 406 of the method 400. Other embodiments of a method of searching a fingerprint trie to determine whether there is a fingerprint match, for example, variations of method 500, are possible and are intended to fall within the scope of the invention. Method 500 and/or portions thereof may be implemented using the data storage system 12 and/or one or more components thereof.

A fingerprint trie is an ordered tree-like data structure of linked nodes in which the position of a node in the trie defines the fingerprint key with which it is associated, and may be considered an associative array. Each fingerprint may be represented by a unique branch of the fingerprint trie defined by the root node and one or more descendant nodes thereof and the links therebetween, terminating in a leaf node. The nodes of a branch between a root node and a leaf node may be referred to herein as internal nodes. Each leaf node may be keyed by a fingerprint, and each internal node may be keyed by a portion of the fingerprint, where each internal node in the fingerprint trie is keyed by a portion of the fingerprint that is a prefix (e.g., of characters) for each of its child nodes, each such key being a sequential portion of a fingerprint starting at a beginning of the fingerprint (e.g., a most significant byte or least significant byte). Each node in the fingerprint trie may have an array of reference/pointer/link fields to specify a pointer to its child node(s). Each pointer field may have an index value indicative of the fingerprint character string that it represents, and a pointer value specifying the child node, if any, corresponding to the index value; i.e., pointed-to by the pointer field. If no child node has been created for a pointer array field, the value of the pointer array field is null. In some embodiments, the granularity at which a fingerprint is parsed for representation in a fingerprint trie is one byte—i.e., byte-by-byte, and the number of pointer fields in the array depends on the total number of possible characters that can be represented by one byte of data=$2^8$=256 characters. That is, in such embodiments, each node in the fingerprint trie may have an array of 256 pointer fields, and may have up to 256 child nodes, each pointed-to by one of the pointer fields.

Each node also may have a value field specifying a value of the node (i.e., a value for the key represented by the node). In some embodiments of the invention, only leaf nodes have non-null values, for example, a physical address reference for the physical storage at which the data portion from which the fingerprint was generated is stored. Thus, a fingerprint can be used as a key to the leaf node that identifies a physical storage location of a data portion uniquely identified by the fingerprint. The root node of a fingerprint trie may be defined to be an empty string or null value. When the fingerprint trie is initially created, the root node is the only node and has all of its array pointers set to null. In some embodiments of the inventions, nodes are only added to a fingerprint trie as needed, i.e., when a new fingerprint not already represented in the fingerprint trie is generated. Thus, a fingerprint trie may consume and waste less memory resources than a conventional hash table (with or without liked lists), as a reservation of contiguous memory space is not required, but rather may only be allocated as needed when a new node is added. Further, as is described in more detail elsewhere herein, nodes of a fingerprint trie may be navigated one or more characters (e.g., bytes) at a time, e.g., by comparing one or more characters of a fingerprint at a time to node values in the fingerprint trie, in contrast to hash tables in which whole fingerprint values are compared. In this manner, each comparison of one of more characters of a fingerprint may consume less computational capacity than each comparison of whole fingerprints using hash tables. Fingerprint matching, and thus deduplication, may be performed faster with fingerprint tries than with hash tables.

In standard fingerprint tries, the index value of each pointer array field is only a single character; i.e., each child node corresponds to only a single character added to the fingerprint prefix represented by the parent node, and nodes that are the only child of a parent node are allowed, and thus having only a single pointer array field of an internal node specifying a non-null value (i.e., of the only child node) is permitted. In a radix fingerprint trie and other types of compressed fingerprint tries, only-child nodes are not allowed, but rather are compressed (i.e., compacted or condensed) into their parent nodes, such that there are no child nodes, and an index value of a pointer field of a root node or an internal node may specify multiple characters of a fingerprint. As a result, except for when it is first initialized or when all possible fingerprint values for a fingerprint space are represented in a fingerprint trie, a compressed fingerprint trie includes less nodes than a standard fingerprint trie. As a result, a compressed fingerprint trie typically consumes less memory resources than a standard fingerprint trie, and may consume less computational resources when searching the fingerprint trie for a matching fingerprint, as less nodes may be accessed and compared when performing the search. For this reason, a compressed fingerprint trie (e.g., radix fingerprint trie) may be considered a space-optimized fingerprint trie.

In some embodiments, a maximum number of linked nodes that needs to be accessed to reach the leaf node defining a fingerprint is equal to the number of bytes defining the fingerprint plus one (because the root node always must be accessed). For example, if fingerprints are 20 bytes long, than a maximum number of linked nodes that needs to be accessed to reach the leaf node defining a fingerprint is 21. In such embodiments, if a standard fingerprint trie is employed in which each array pointer has an index value representing a single character corresponding to a single byte, the number of linked nodes that needs to be accessed to reach the leaf node defining a fingerprint is the same for every fingerprint, equal to the maximum number of linked nodes. However, if a compressed fingerprint trie is employed in which each array pointer index value may be multiple characters corresponding to multiple bytes of a fingerprint, the number of linked nodes that need to be accessed to reach the leaf node may be less the maximum number of linked nodes. For either a standard or compressed trie, the computation effort in searching the trie is a function of the size of the fingerprints, not the number of fingerprints stored in the fingerprint trie, as is the case with hash tables. For example, as described above, if a predetermined size of fingerprints is 20 bytes, at most only 21 nodes of the fingerprint trie needs to be accessed, regardless of the number of fingerprints represented in the fingerprint trie. Examples of standard and compressed fingerprint tries are described in more detail elsewhere herein.

Returning to the method 500, in a step 502, a current node may be initialized to a root node and an initial byte count may be set to 0, after which the loop defined by steps 506-514 may be repeated until it is determined whether there is a fingerprint match. The byte count may be used in embodiments in which each fingerprint has a same length—i.e., has a same number of bytes. In the step 506, it may be determined whether an active pointer of the current node matches the next one or more bytes of the fingerprint. As used herein, an active pointer is a pointer field for which a non-null pointer value is specified, and determining whether an active pointer of the current node matches the next one more bytes of the finger print means determining whether the current node has a pointer field that has an index value specifying one or more characters that are the same as the one or more next characters of the fingerprint, and if so, whether such pointer field specifies a non-null value; i.e., specifies a child node. In embodiments in which a standard trie is used, the index values of pointer fields are only one character, such that the step 502 involves comparing only the character represented by a single next byte of the fingerprint. In embodiments in which a compressed fingerprint trie is used, index values may be one or more characters and thus the characters of the next one or more bytes of the fingerprint may be compared. It should be appreciated that, when the current code is the root node, the next one or more bytes of the fingerprint are the first one or more bytes of the fingerprint. On future passes through the steps 506-514 for internal nodes, the next one or more bytes are the bytes remaining in the fingerprint following the one or more previous bytes for which a match was determined in the step 506.

If there is no match determined for one or more bytes in the step 506, then in a step 508 it may be determined that there is no matching fingerprint in the fingerprint trie, and the method 500 may end, which may result in method 400 proceeding to the step 408 in the method 400. If a match is determined for one or more bytes in the step 506, then in a step 510 the current node may be changed to the child node of the fingerprint trie pointed-to (i.e., specified by) by the pointer field of the matching active pointer, and in a step 512 the byte count may be incremented by a number of the one or more bytes that matched the index value of pointer field. In embodiments in which a standard fingerprint trie is used, index values are only one character and thus the value of only the next one byte was compared and matched, and thus the byte count is always only incremented by one. In embodiments in which a compressed fingerprint trie is used, the index values of pointer fields may be one or more characters and thus the character(s) represented by the next one or more bytes are compared and matched, and thus the byte count may be incremented by a number equal to the number of characters (i.e., one or more) that matched.

In a step 514, it may be determined whether the byte count equals a predefined fingerprint length (e.g., 20 bytes), which would indicate that the current node is a leaf node and a fingerprint match has been determined as indicated in a step 516, after which the method 500 may end, which may result in proceeding to the step 416 in the method 400. If in the step 514 it is determined that byte count does not equal the fingerprint length, this means that the current node is an internal node, and method 500 may proceed to the step 506 for processing of the current internal node. It should be appreciated that in embodiments in which only leaf nodes specify non-null values, e.g., a physical address reference, it may be determined whether the current node specifies a non-null value, in which case the current node is a leaf node and a fingerprint match has been determined, as an alternative to keeping a byte count and checking it in the step 514.

Examples of implementations of the method 400, one example using a standard fingerprint trie and a second example using a compressed fingerprint trie, will be now be described. In the examples, fingerprint tries are used in which a fingerprint is only three characters in length, and can only have three possible values: "A", "B" and "C." However, it should be appreciated that the invention is not so limited and can apply, for example, to fingerprints of 20 characters in length (e.g., each character=one byte) where each byte can have up to 256 possible values.

Figure 6B:
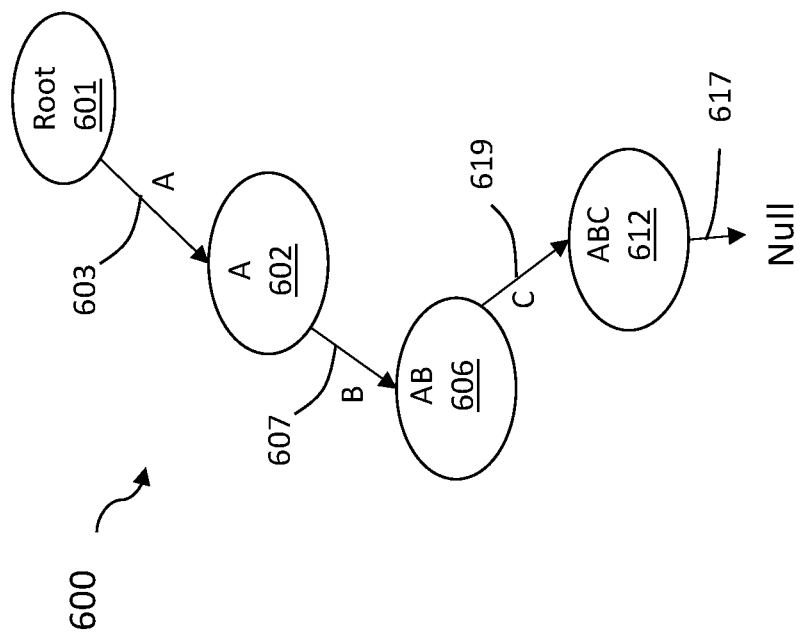
FIGS. 6A-6D illustrate an example of a standard fingerprint trie, according to embodiments of the invention.
Figure 6A:
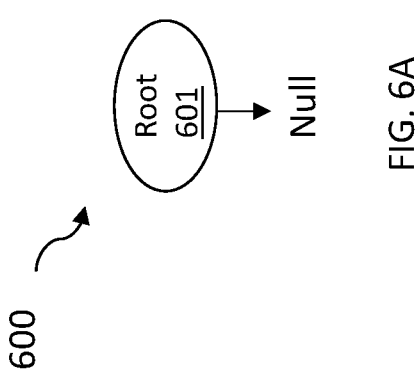
Figure 6D:
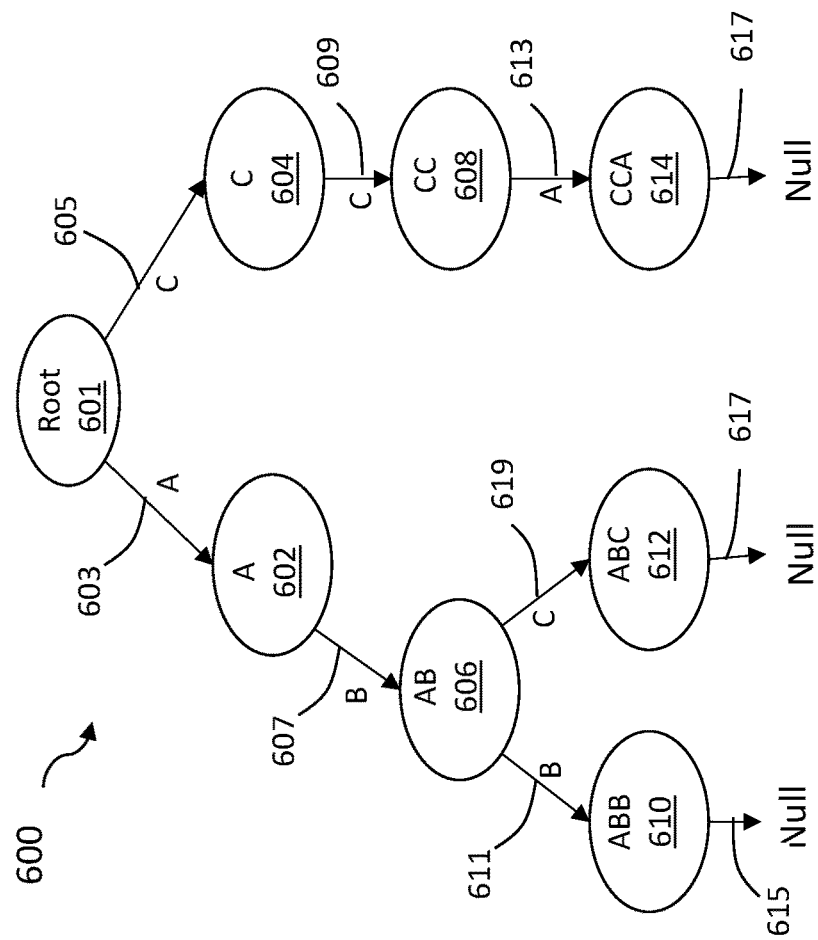

In a first example, a standard fingerprint trie is used. Reference is now made to FIG. 6A, which illustrates an example of a standard fingerprint trie 600, according to embodiments of the invention. In the example of FIG. 6A, as well as examples of FIGS. 6B-9D, fingerprint tries are used in which a fingerprint is only three characters in length, and can only have three possible values: "A", "B" and "C." The characters that appear within the internal and leaf nodes illustrated in FIGS. 6B-6D and 8B-8D are not values defined by the nodes, but rather keys for accessing the nodes. In FIG. 6A, the standard fingerprint trie 600 illustrates an initialized standard fingerprint trie before any fingerprints have been added, in which the only node is the root node 601, and for which all pointers are inactive (i.e., all pointer fields specify null values). In some embodiments, a fingerprint trie node may include another field, e.g., a master pointer field, that specifies when all pointers are inactive, and this field may be used to determine when a root node is the only node in a fingerprint trie or when a node is a leaf node. FIG. 7A illustrates a more detailed example of the standard fingerprint trie 600 following initialization, according to embodiments of the invention, illustrating that root node 601 may include a value field 621 indicating an empty string or null value and an array 637 including array fields for index values "A" "B" and "C" that are all inactive.

Figure 7B:
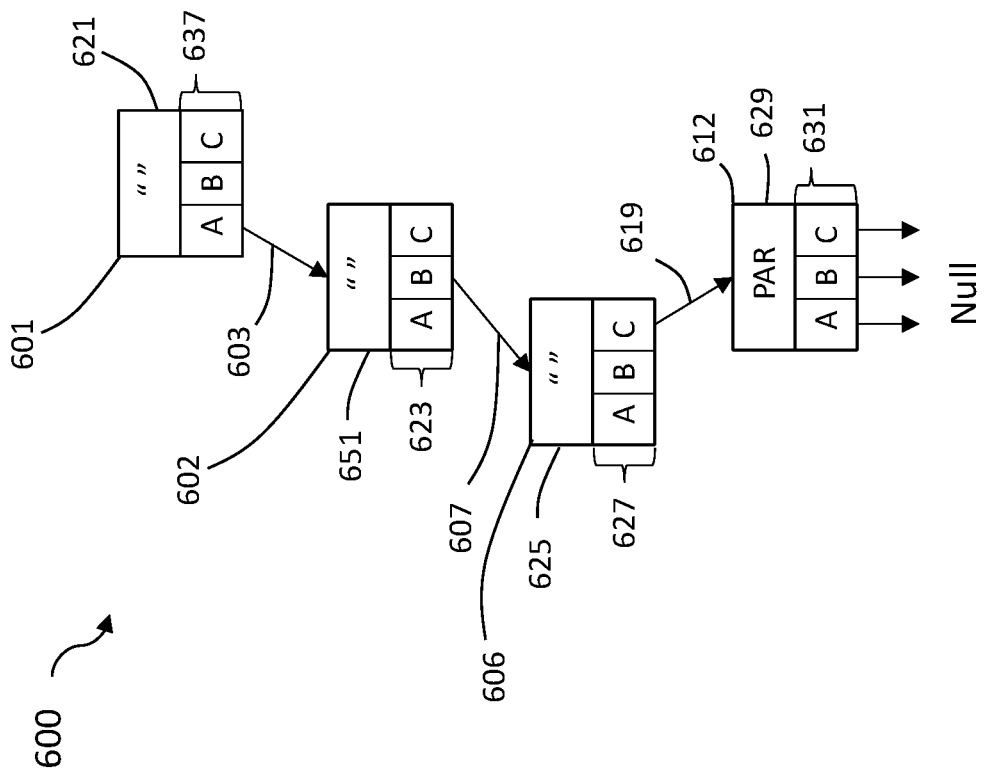

In the step 402, a fingerprint="ABC" is a first fingerprint generated for the fingerprint trie 600. After performance of the initialization steps 502 and 504, performance of the step 506 for the root node 601 determines that no active pointer values match any beginning portion of the fingerprint, as all pointer field values are null. Accordingly, in the step 508 it is determined that there is no match. Returning to the method 400, in the step 408, the data portion from which the fingerprint "ABC" was generated is stored in the data storage system, and in the step 410, the fingerprint trie 600 is modified as illustrated in FIGS. 6B and 7B, to include nodes 602, 606 and 612 for each of characters "A," "B" and "C," respectively, nodes 602 and 606 being internal nodes specifying null values 621 and 651, and node 612 being a leaf node specifying a physical address reference (PAR) 629 for the data portion from which the fingerprint "ABC" was generated. Nodes 601, 602 and 606 have arrays 637, 623 and 627, for which active pointers 603, 607 and 619 for index values "A," "B" and "C" have pointer values pointing to nodes 602, 606 and 612, respectively, and the remaining pointers in arrays 637, 623 and 627, and all pointers of array 631, are inactive (i.e., have null pointer field values).

When a next fingerprint "ABB" is generated in the step 402, e.g., in response to a write request received from a host, the current node is set to root node 601 in the step 502, and a byte counter is set to 0 in the step 504. Performance of the step 506 for the root node 601 determines that the index value for active pointer 603="A" matches the value of the first byte="A" of the generated fingerprint. Accordingly, in a next step 510, the current node is set to the node 602 pointed-to by pointer 603, and in the step 512 the byte count is incremented by 1: 0+1=1. In the step 514, it is determined that the byte count=1 is not equal to the fingerprint length of 3, and the method 500 returns to the step 506, performance of which determines that the index value of the active pointer 607="B" matches the value of the next byte="B" of the generated fingerprint. Accordingly, in a next step 510, the current node is set to the node 606 pointed-to by pointer 607, and in the step 512 the byte count is incremented by 1: 1+1=2. In the step 514, it is determined that the byte count=2 is not equal to the fingerprint length of 3, and the method 500 returns to the step 506, performance of which determines that none of the active pointers of node 606 match the value of the next byte="B" of the generated fingerprint.

Figure 6C:
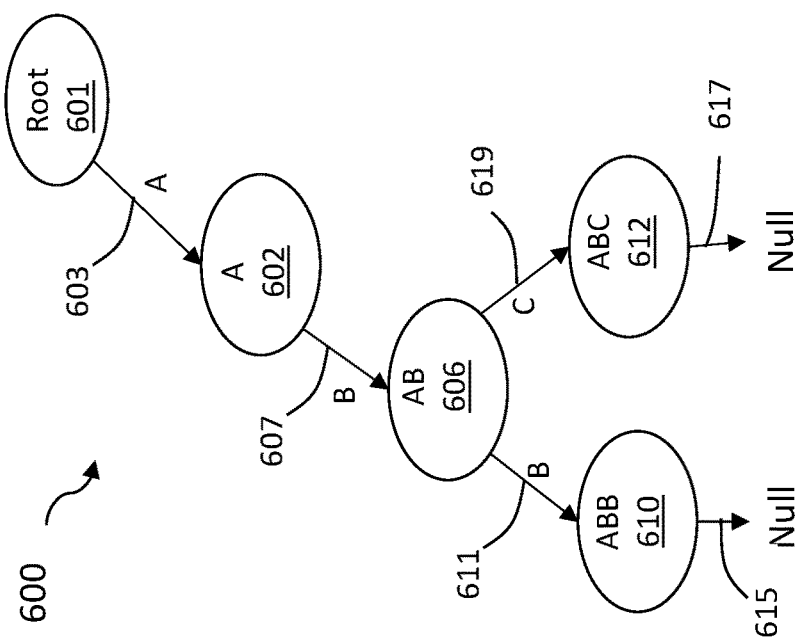
Figure 7A:
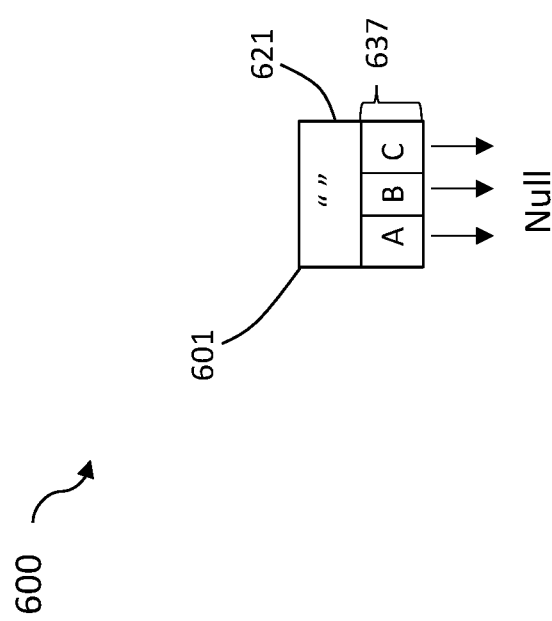

Returning to the method 400, in the step 408, the data portion from which the fingerprint "ABB" was generated is stored in the data storage system, and in the step 410, the fingerprint trie 600 is modified as illustrated in FIGS. 6C and 7C to include new leaf node 610 for third character "B" of the fingerprint, specifying a physical address reference (PAR) 629 for the data portion from which the fingerprint "ABB" was generated, and having an array 635 with all inactive pointers. Array 627 of the node 606 is updated to have a pointer value of the pointer field for the index value "B" point to the new leaf node 610.

When a next fingerprint "CCA" is generated in the step 402, e.g., in response to a write request received from a host, the current node is set to root node 601 in the step 502, and a byte counter is set to 0 in the step 504. Performance of the step 506 for the root node 601 determines that no active pointers of the root node match any beginning portion of the fingerprint. Accordingly, in the step 508 it is determined that there is no match. Returning to the method 400, in the step 408 the data portion from which the fingerprint "CCA" was generated is stored in the data storage system, and in the step 410 the fingerprint trie 600 is modified as illustrated in FIGS. 6D and 7D, to create internal nodes 604 and 608 for characters "C" and "C" respectively, create leaf node 614 for character "A," which specifies a physical address reference in PAR field 649 for the data portion from which the fingerprint "CCA" was generated. Nodes 601, 604 and 608 have arrays 637, 643 and 647, including active pointers 639, 609 and 613 for index values "C," "C" and "A" that point to nodes 604, 608 and 614, respectively, and all pointers of array 631 are inactive.

When a next fingerprint "ABB" is generated, e.g., in response to a write request received from a host, the current node is set to root node 601 in the step 502 and a byte counter is set to 0 in the step 504. Performance of the step 506 for the root node 601 determines that the index value of the active pointer 603="A" matches the value of the first byte="A" of the generated fingerprint. Accordingly, in a next step 510, the current node is set to the internal node 602 pointed-to by pointer 603, and in the step 512 the byte count is incremented by 1: 0+1=1. In the step 514, it is determined that the byte count=1 is not equal to the fingerprint length of 3, and the method 500 returns to the step 506, performance of which determines that the index value of the active pointer 607="B" matches the value of the next byte="B" of the generated fingerprint. Accordingly, in a next step 510, the current node is set to the internal node 606 pointed-to by pointer 607, and in the step 512 the byte count is incremented by 1: 1+1=2. In the step 514, it is determined that the byte count=2 is not equal to the fingerprint length of 3, and the method 500 returns to the step 506, performance of which determines that the index value of the active pointer 619="B" matches the value of the next byte="B" of the generated fingerprint. Accordingly, in a next step 510, the current node is set to the leaf node 612 pointed-to by pointer 619, and in the step 512 the byte count is incremented by 1: 1+1=3. In the step 514, it is determined that the byte count=3 is equal to the fingerprint length of 3 bytes, from which it is determined in the step 516 that the current node 612 is a leaf node indicating that a fingerprint match has been determined, and the method 500 ends, returning to the step 416 of the method 400. In the step 416, the physical address reference stored in the field 629 of the node 612 is copied and stored in the entry in physical address reference table 300 for the data portion from which the fingerprint generated in the step 402 was generated.

A second example of implementation of the steps 404-412 of method 400 will be now be described, in which a compressed fingerprint trie is used, and in which a fingerprint is only three characters in length, and can only have three possible values: "A", "B" and "C."

Figure 8A:
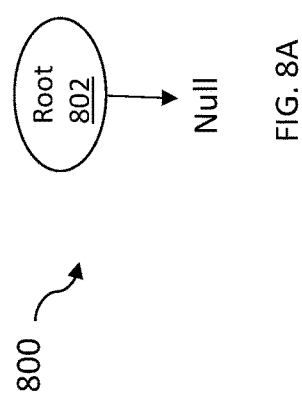
FIGS. 8A-8D illustrate an example of a compressed fingerprint trie, according to embodiments of the invention.
Figure 9B:
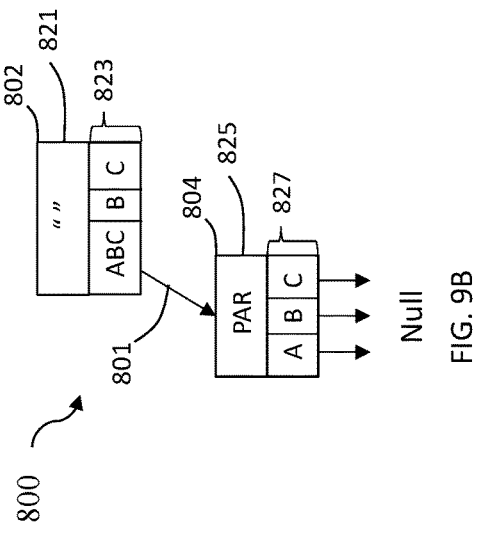
FIGS. 9A-9D illustrate a more detailed example of a compressed fingerprint trie, according to embodiments of the invention.
Figure 9D:
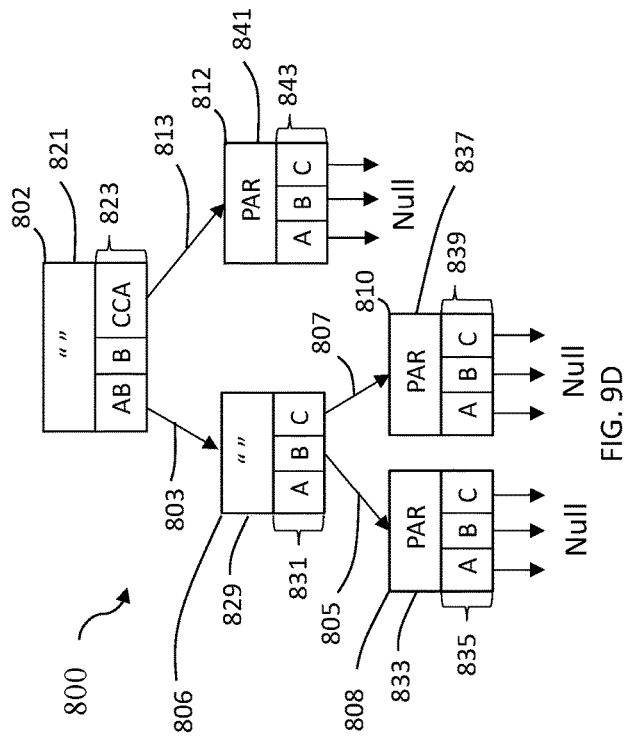
Figure 9A:
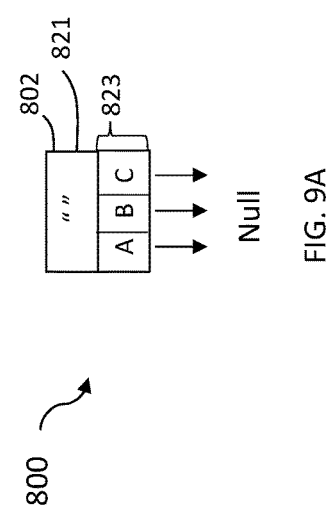

Reference is now made to FIG. 8A, which illustrates an example of a compressed fingerprint trie 800, according to embodiments of the invention. In FIG. 8A, the compressed fingerprint trie 800 illustrates an initialized compressed fingerprint trie before any fingerprints have been added, in which the only node is the root node 802, and for which all pointers are inactive. FIG. 9A illustrates a more detailed example of a compressed fingerprint trie 800 following initialization, according to embodiments of the invention, illustrating that root node 802 may include a value field 821 indicating an empty string or null value and an array 823 including array fields for index values "A" "B" and "C" all of which are inactive.

Figure 8B:
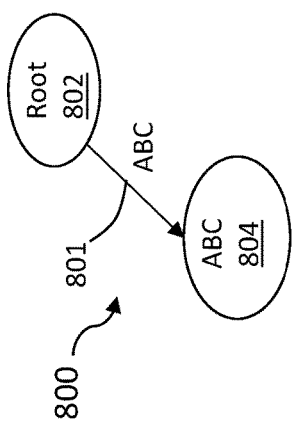

In the step 402, a fingerprint="ABC" is a first fingerprint generated for the fingerprint trie 800. After performance of the initialization steps 502 and 504, performance of the step 506 for the root node 802 determines that no active pointers of the root node 802 match any beginning portion of the fingerprint "ABC", as all pointers are inactive. Accordingly, in the step 508 it is determined that there is no match. Returning to the method 400, in the step 408, the data portion from which the fingerprint "ABC" was generated is stored in the data storage system, and in the step 410, the fingerprint trie 800 may be modified as illustrated in FIGS. 8B and 9B, for example, by performance of the method 1000 illustrated in FIG. 10.

Figure 10:
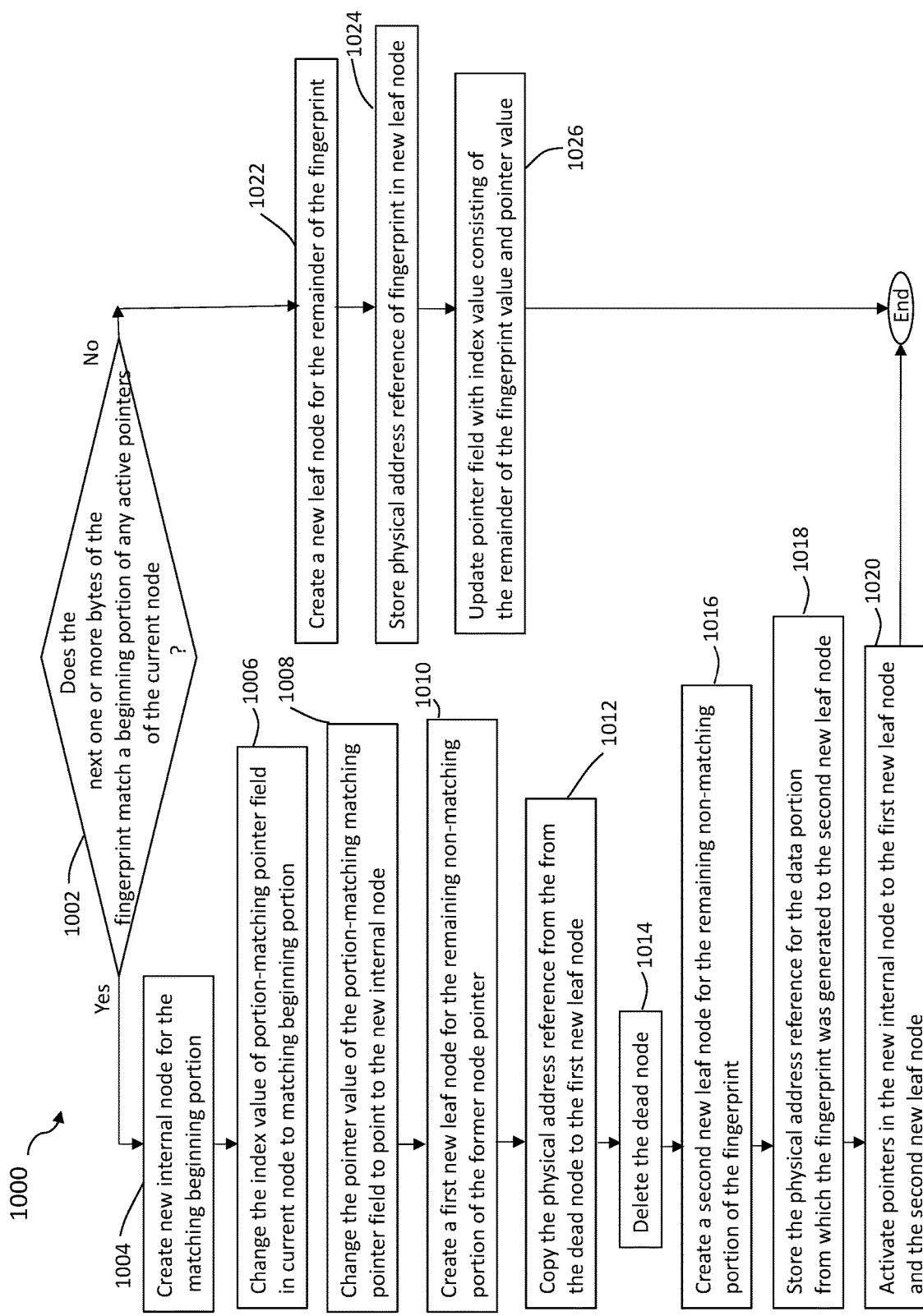
FIG. 10 is a flowchart illustrating an example of a method of modifying a compressed fingerprint trie in response to determining a fingerprint match, according to embodiments of the invention.

FIG. 10 is a flowchart illustrating an example of a method 1000 of modifying a compressed fingerprint trie, specifically a radix fingerprint trie, in response to determining a fingerprint match, according to embodiments of the invention. Other embodiments of a method of modifying a compressed fingerprint trie in response to determining a fingerprint match, for example, variations of method 1000, are possible and are intended to fall within the scope of the invention. Method 1000 and/or portions thereof may be implemented using data storage system 12 and/or one or more components thereof.

In a step 1002, it may be determined whether the next one or more bytes of the fingerprint "ABC" generated in the step 402 match a beginning portion of any of the active pointers of the current node—i.e., match the beginning portion an index value of a pointer field for which a non-null pointer value is specified. The next one or more bytes are the next one or more bytes of the fingerprint after any sequence of bytes starting at the beginning of the fingerprint for which no node pointers have been matched during performance of the method 500 for the fingerprint. In the current example, the current node is the root node 802, and "ABC" is a first fingerprint generated for the compressed fingerprint trie, such that all current node pointers are inactive. Accordingly, the step 1002 determines that that there is no such match, and the method 1000 proceeds to a step 1022, in which a new leaf node 804 may be created for the remainder of the fingerprint that was not matched, in this case, the entire fingerprint "ABC", as reflected in FIGS. 8B and 9B, having an array 827 of inactive pointers. In the step 1024 the value of the new leaf node 804 may be set to a physical storage reference for the data portion from which the fingerprint "ABC" was generated. In the step 1026, the pointer field in the current node 802 for the index value "A" is updated with an index value consisting of the remainder of the fingerprint that was not matched, in this case, the entire fingerprint "ABC," and the pointer field pointer value specifies pointer 801 to the new leaf node. Returning to the method 500, in the step 412, a reference to the physical address of the data portion for which the fingerprint "ABC") was generated may be stored in the entry for the data portion in the physical address reference table 300.

Figure 8C:
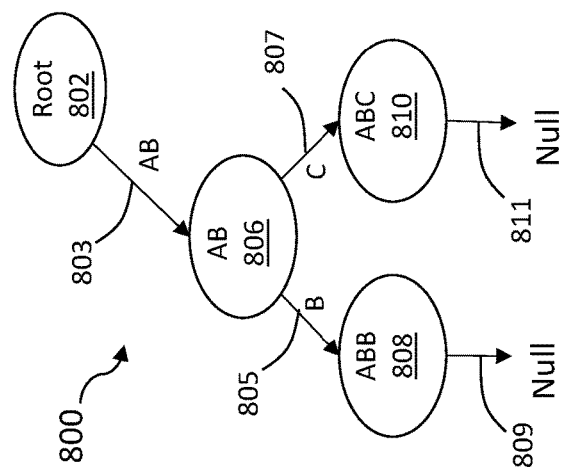
Figure 9C:
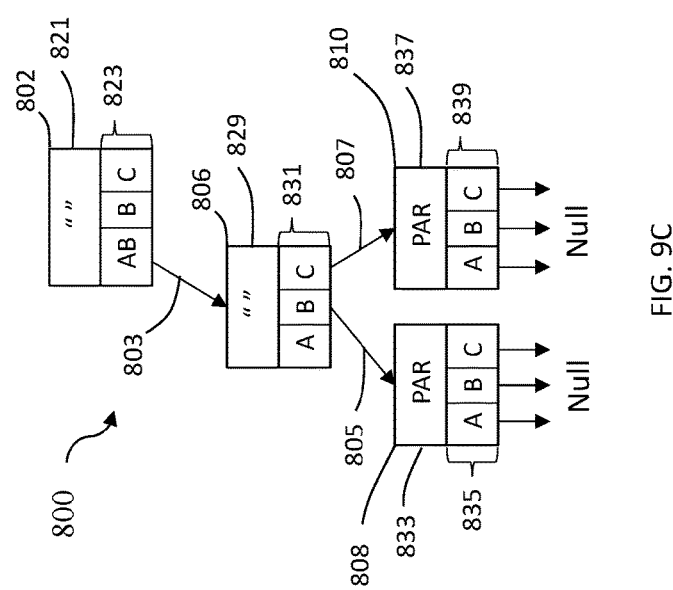

Returning to the method 400, when a next fingerprint "ABB" is generated in the step 402, e.g., in response to a write request received from a host, the current node is set to root node 802 in the step 502, and a byte counter is set to 0 in the step 504. Performance of the step 506 for the root node 802 determines that no pointer values of the root node match any beginning portion of the fingerprint. Specifically, the only non-null pointer value="ABC" does not match "ABB." Accordingly, in the step 508 it is determined that there is no match. Returning to the method 400, in the step 408, the data portion from which the fingerprint "ABB" was generated is stored in the data storage system, and in the step 410 the fingerprint trie 800 may be modified as illustrated in FIGS. 8C and 9C, for example, by performance of the method 1000 illustrated in FIG. 10.

In the step 1002, it may be determined whether the next one or more bytes of the fingerprint "ABB" match a beginning portion of any of the active pointers of the current node (e.g., node 802); i.e., match the beginning portion an index value of a pointer field for which a non-null pointer value is specified. In the example, the step 1002 determines that the first two bytes of the fingerprint="AB" equals a beginning portion of the index value of the active pointer for "ABC" and the method 1000 proceeds to a step 1004, in which a new internal node (e.g., node 806) may be created for the matching portion (e.g., "AB"). In a step 1006, the index value (e.g., "ABC") of the index value of the pointer field of the current node (e.g., node 802) that has the matching beginning portion (the portion-matching pointer field) may be changed to the matching beginning portion (e.g., "AB"), and in a step 1008 the pointer value of the portion-matching pointer field may be changed (e.g., from 801 to 803) to point to the new internal node (e.g., 806). The node to which the changed pointer value formerly pointed (e.g., node 804) is referred to herein as the dead node. In a step 1010, a first new leaf node (e.g., leaf node 810) may be created for the remaining non-matching portion (e.g., "C") of the portion-matching pointer field, and in a step 1012, the physical address reference may be copied from the dead node (e.g., node 804) to the first new leaf node (e.g., leaf node 810).

In a step 1014, the dead node may be deleted. In a step 1016, a second new leaf node (e.g., the leaf node 808) may be created for the remaining non-matching portion (e.g., "B") of the fingerprint. In a step 1018, the physical address reference for the data portion from which the fingerprint (e.g., "ABB") was generated may be stored to the second new leaf node (e.g., the leaf node 808), e.g., in the value field (e.g., field 833) of the second new leaf node. In a step 1020, pointers (e.g., 807 and 805) to the first and second new leaf nodes may be activated. Returning to the method 400, in the step 412, a reference to the physical address of the data portion for which the fingerprint (e.g., "ABB") was generated may be stored in the entry for the data portion in the physical address reference table 300.

Figure 8D:
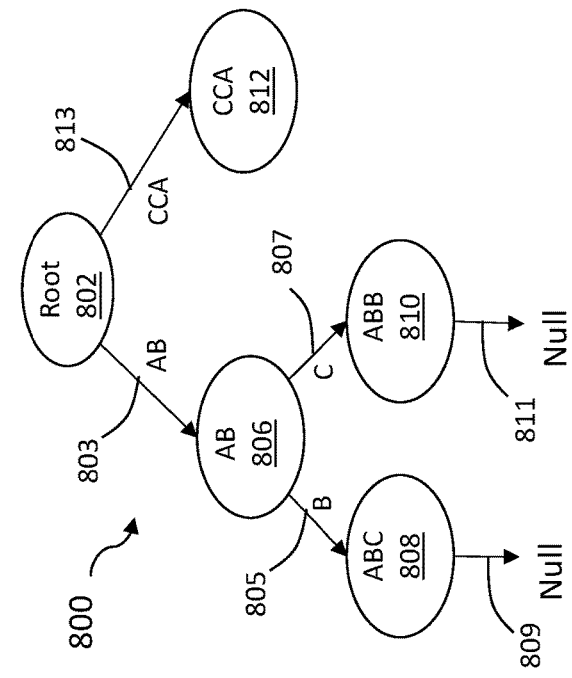

Returning to the method 400, when a next fingerprint "CCA" is generated in the step 402, e.g., in response to a write request received from a host, the current node is set to root node 802 in the step 502 and a byte counter is set to 0 in the step 504. Performance of the step 506 for the root node 802 determines that no active pointers of the root node match any beginning portion of the fingerprint. Specifically, the only active pointer value="AB" does not match "CC." Accordingly, in the step 508 it is determined that there is no match. Returning to the method 400, in the step 408, the data portion from which the fingerprint "CCA" was generated is stored in the data storage system, and in the step 410, the fingerprint trie 800 may be modified as illustrated in FIGS. 8D and 9D, for example, by performance of the method 1000 illustrated in FIG. 10.

In a step 1002, it may be determined whether the next one or more bytes of the fingerprint "CCA" generated in the step 402 match a beginning portion of any of the active pointers of the current node—i.e., match the beginning portion an index value of a pointer field for which a non-null pointer value is specified. The step 1002 determines that the next byte "C" does not equals a beginning portion (="A") of the only active pointer of the root node ("AB"), and the method 1000 proceeds to the step 1022, in which a new leaf node 812 may be created for the remainder of the fingerprint that was not matched, in this case, the entire fingerprint "CCA," as reflected in FIGS. 8D and 9D, having an array 843 of inactive pointers. In the step 1024, the value of the new leaf node 812 may be set to a physical storage reference for the data portion from which the fingerprint "CCA" was generated. In the step 1026, the pointer field in the current node 802 for the index value "C" is updated with an index value consisting of the remainder of the fingerprint that was not matched, in this case, the entire fingerprint "CCA," and the pointer field pointer value specifies pointer 813 to the new leaf node 812. Returning to the method 500, in the step 412, a reference to the physical address of the data portion for which the fingerprint "CCA" was generated may be stored in the entry for the data portion in the physical address reference table 300.

When a next fingerprint "ABB" is generated in the step 402, e.g., in response to a write request received from a host, the current node is set to root node 802 in the step 502 and a byte counter is set to 0 in the step 504. Performance of the step 506 for the root node 802 determines that the index value of pointer 803="AB" matches the value of the first two bytes="AB" of the generated fingerprint. Accordingly, in a next step 510, the current node is set to the node 806 pointed-to by pointer 803, and in the step 512 the byte count is incremented by 2: 0+2=2. In the step 514, it is determined that the byte count=2 is not equal to the fingerprint length of 3, and the method 500 returns to the step 506, performance of which determines that the value of the pointer 805="B" matches the value of the next byte="B" of the generated fingerprint. Accordingly, in a next step 510, the current node is set to the node 808 pointed-to by pointer 805, and in the step 512 the byte count is incremented by 1: 2+1=3. In the step 514, it is determined that the byte count=3 is equal to the fingerprint length of 3 bytes, from which it is determined in the step 516 that the current node 808 is a leaf node indicating that a fingerprint match has been determined, and the method 500 ends, returning to the step 416 of the method. In the step 416, the physical address reference stored in the field 833 of the node 808 is copied and stored in the entry in physical address reference table 300 for the data portion from which the fingerprint generated in the step 402 was generated.

It should be appreciated that one or more steps of the method 1000, or parts thereof may be performed concurrently or in different orders than illustrated in FIG. 4. For example, various of the steps 1004-1020 may be performed concurrently or in different orders than illustrated in relation to others of the steps 1004-1020.

A comparison between the evolution of the standard fingerprint trie 600 shown in FIGS. 6A-6D to the evolution of the compressed fingerprint trie 800 illustrated in FIGS. 8A-D, respectively, for the same three fingerprints "ABC," "ABB" and "CCA" illustrates how the compressed fingerprint trie 800 is essentially the standard fingerprint trie for which only-child nodes are compressed into their parent nodes. For example, the node 804 of the compressed fingerprint trie 800 of FIG. 8B represents a compressed version of the nodes 602, 606 and 612 of standard fingerprint trie 600 illustrated in FIG. 6B, and node 812 of the compressed fingerprint trie 800 of FIG. 8D represents a compressed version of the nodes 609, 613 and 617 of the standard fingerprint trie 600 illustrated in FIG. 6D.

A comparison between the evolution of the standard fingerprint trie 600 shown in FIGS. 6A-6D to the evolution of the compressed fingerprint trie 800 illustrated in FIGS. 8A-D also illustrates the space optimization that a compressed fingerprint trie, e.g., in form of a radix trie, can provide over a standard fingerprint trie. For each stage of evolution, except for the initialization, the compressed fingerprint trie 800 uses less nodes (2, 4 and 5 in FIGS. 8B, 8C and 8D, respectively) than the standard trie 600 (4, 5 and 8 in FIGS. 6B, 6C and 6D, respectively), resulting in less consumption memory resources, and thus faster trie traversal, for example, when searching for matching fingerprints.

Various embodiments of the invention discussed herein may be combined with each other in appropriate combinations. Additionally, in some instances, the order of steps in the flowcharts, flow diagrams and/or described flow processing may be modified, where appropriate. It should be appreciated that any of the methods described herein, including 400, 500 and 1000, or parts thereof, may be implemented using one or more of the systems described in relation to FIGS. 1-3 or components thereof. Further, various aspects of the invention may be implemented using software, hardware, a combination of software and hardware and/or other computer-implemented modules or devices having the described features and performing the described functions.

Software implementations of embodiments of the invention may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. Embodiments of the invention may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of performing deduplication on a first data portion of an I/O operation for a storage system, the method comprising:
   generating a first fingerprint of the first data portion; and
   searching a fingerprint trie generated from a plurality of fingerprints generated from a plurality of data portions to determine whether the first data portion is a duplicate of one of the plurality of data portions,
   wherein the fingerprint trie is an ordered tree-like data structure of linked nodes in which a position of a node in the trie defines a fingerprint key with which it is associated,
   wherein the fingerprint trie is a compressed fingerprint trie, wherein no internal nodes of the fingerprint trie have only one child node,
   wherein the fingerprint trie has a root node, and the first fingerprint has a predefined number of bytes, and
   wherein searching the fingerprint trie includes determining whether the root node references a first node of the fingerprint trie representing a string of one or more characters matching one or more characters represented by one or more bytes of the predefined number of bytes of the first fingerprint.

2. The method of claim 1, further comprising:
   if it is determined that the root node references the first node, determining whether the first node references a second node of the fingerprint trie representing a string of one or more characters matching one or more characters represented by one or more bytes of the predefined number of bytes of the first fingerprint succeeding the first string.

3. The method of claim 1, wherein it is determined that the first data portion is not a duplicate of the one or the plurality of data portions if it is determined that there is not a first node of the fingerprint trie representing a string of one or more characters matching one or more characters represented by one or more bytes of the predefined number of bytes of the first fingerprint.

4. The method of claim 1, wherein the method further comprises:
    if it determined by searching the fingerprint trie that the first data portion is not a duplicate of the one or the plurality of data portions, modifying the fingerprint trie to include a representation of the first fingerprint.

5. The method of claim 1, wherein the method further comprises, if it determined by searching the fingerprint trie that the first data is a duplicate of the one or the plurality of data portions:
    copying a physical storage address reference from a node of the fingerprint trie corresponding to the determined duplicate; and
    storing the physical storage address reference in an entry of a physical address reference table corresponding to the first data portion.

6. A system for performing deduplication on a first data portion of an I/O operation, the system comprising:
    one or more processors; and
    a memory comprising code stored thereon that, when executed, performs a method comprising:
        generating a first fingerprint of the first data portion; and
        searching a fingerprint trie generated from a plurality of fingerprints generated from a plurality of data portions to determine whether the first data portion is a duplicate of one of the plurality of data portions,
    wherein the fingerprint trie is an ordered tree-like data structure of linked nodes in which a position of a node in the trie defines a fingerprint key with which it is associated,
    wherein the fingerprint trie is a compressed fingerprint trie, wherein no internal nodes of the fingerprint trie have only one child node,
    wherein the fingerprint trie has a root node, and the first fingerprint has a predefined number of bytes, and
    wherein searching the fingerprint trie includes determining whether the root node references a first node of the fingerprint trie representing a string of one or more characters matching one or more characters represented by one or more bytes of the predefined number of bytes of the first fingerprint.

7. The system of claim 6, wherein the method further comprises, if it is determined that the root node references the first node, determining whether the first node references a second node of the fingerprint trie representing a string of one or more characters matching one or more characters represented by one or more bytes of the predefined number of bytes of the first fingerprint succeeding the first string.

8. The system of claim 6, wherein it is determined that the first data portion is not a duplicate of the one or the plurality of data portions if it is determined that there is not a first node of the fingerprint trie representing a string of one or more characters matching one or more characters represented by one or more bytes of the predefined number of bytes of the first fingerprint.

9. The system of claim 6, wherein the method further comprises, if it determined by searching the fingerprint trie that the first data portion is not a duplicate of the one or the plurality of data portions, modifying the fingerprint trie to include a representation of the first fingerprint.

10. The system of claim 6, wherein the method further comprises, if it determined by searching the fingerprint trie that the first data is a duplicate of the one or the plurality of data portions:
    copying a physical storage address reference from a node of the fingerprint trie corresponding to the determined duplicate; and
    storing the physical storage address reference in an entry of a physical address reference table corresponding to the first data portion.

11. A non-transitory computer-readable medium having software stored thereon for performing deduplication on a first data portion of an I/O operation, the software comprising:
    executable code that generates a first fingerprint of the first data portion; and
    executable code that searches a fingerprint trie generated from a plurality of fingerprints generated from a plurality of data portions to determine whether the first data portion is a duplicate of one of the plurality of data portions,
    wherein the fingerprint trie is an ordered tree-like data structure of linked nodes in which a position of a node in the trie defines a fingerprint key with which it is associated,
    wherein the fingerprint trie is a compressed fingerprint trie, wherein no internal nodes of the fingerprint trie have only one child node,
    wherein the fingerprint trie has a root node, and the first fingerprint has a predefined number of bytes, and
    wherein the executable code that searches the fingerprint trie includes executable code that determines whether the root node references a first node of the fingerprint trie representing a string of one or more characters matching one or more characters represented by one or more bytes of the predefined number of bytes of the first fingerprint.

12. The non-transitory computer-readable medium of claim 11, wherein the software further comprises executable code that, if it is determined that the root node references the first node, determines whether the first node references a second node of the fingerprint trie representing a string of one or more characters matching one or more characters represented by one or more bytes of the predefined number of bytes of the first fingerprint succeeding the first string.

13. The non-transitory computer-readable medium of claim 11, wherein the software further comprises executable that, if it determined by searching the fingerprint trie that the first data portion is not a duplicate of the one or the plurality of data portions, modifies the fingerprint trie to include a representation of the first fingerprint.

14. The non-transitory computer-readable medium of claim 11, wherein the software further comprises executable code that, if it determined by searching the fingerprint trie that the first data is a duplicate of the one or the plurality of data portions:
    copies a physical storage address reference from a node of the fingerprint trie corresponding to the determined duplicate; and
    stores the physical storage address reference in an entry of a physical address reference table corresponding to the first data portion.

* * * * *